A. J. McCAULEY.
CAR TRUCK.
APPLICATION FILED AUG. 17, 1911.

1,027,746.

Patented May 28, 1912.

3 SHEETS—SHEET 1.

Attest
Albert Bristow
Fannie E. Weber

Inventor:
Albert J. McCauley

A. J. McCAULEY.
CAR TRUCK.
APPLICATION FILED AUG. 17, 1911.

1,027,746.

Patented May 28, 1912.

3 SHEETS—SHEET 2.

Attest
Albert Bristow
Fannie E. Weber

Inventor:
Albert J. McCauley

A. J. McCAULEY.
CAR TRUCK.
APPLICATION FILED AUG. 17, 1911.

1,027,746.

Patented May 28, 1912.
3 SHEETS—SHEET 3.

Attest
Albert T Bristow
Fannie E Weber.

Inventor:
Albert J. McCauley

UNITED STATES PATENT OFFICE.

ALBERT J. McCAULEY, OF ST. LOUIS, MISSOURI.

CAR-TRUCK.

1,027,746.   Specification of Letters Patent.   Patented May 28, 1912.

Application filed August 17, 1911. Serial No. 644,546.

*To all whom it may concern:*

Be it known that I, ALBERT J. MCCAULEY, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, in which—

Figure 1:
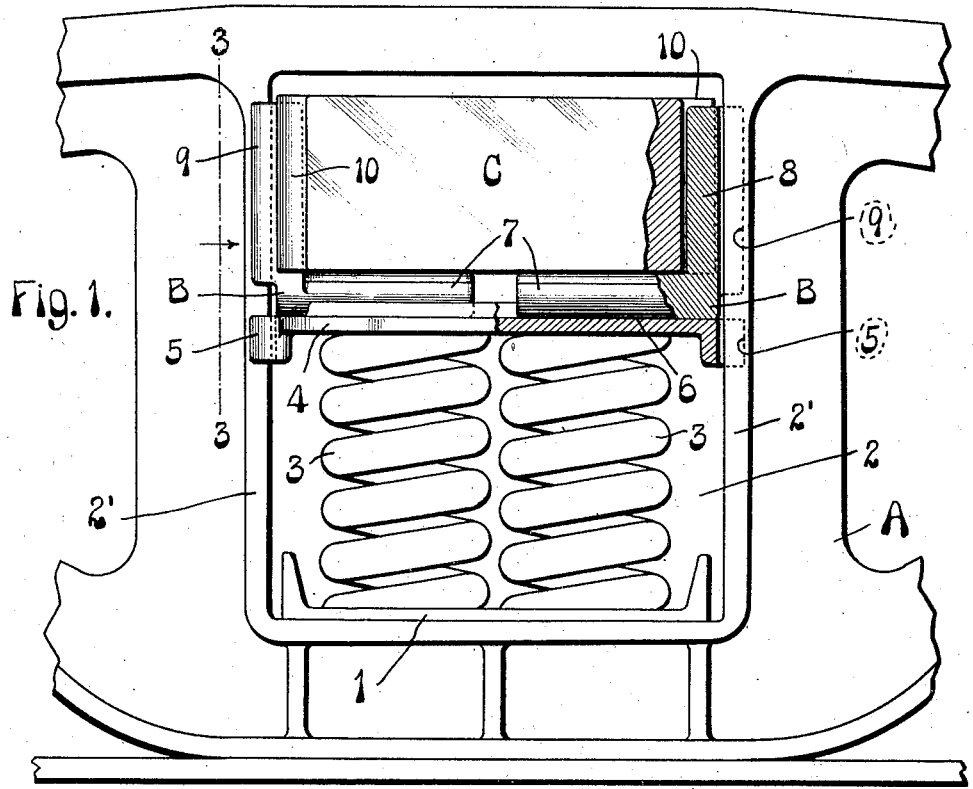
Figure 2:
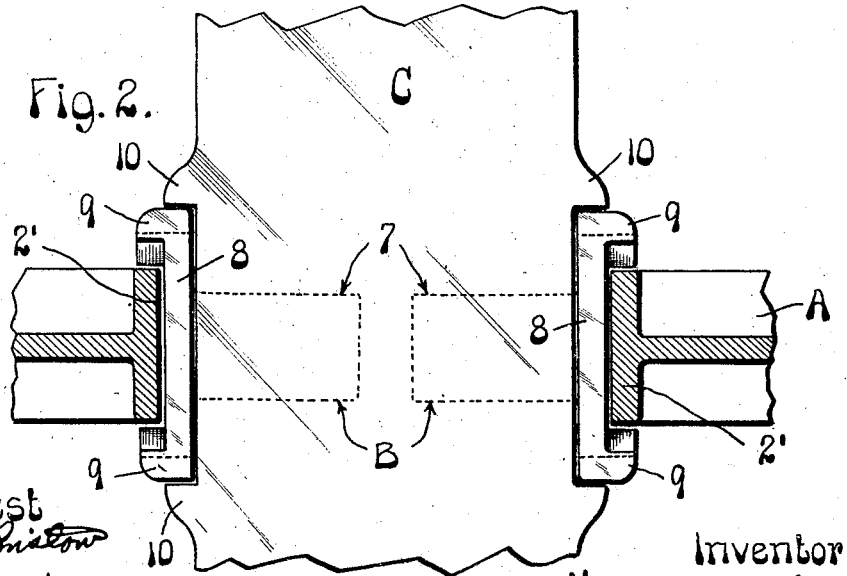
Figure 3:
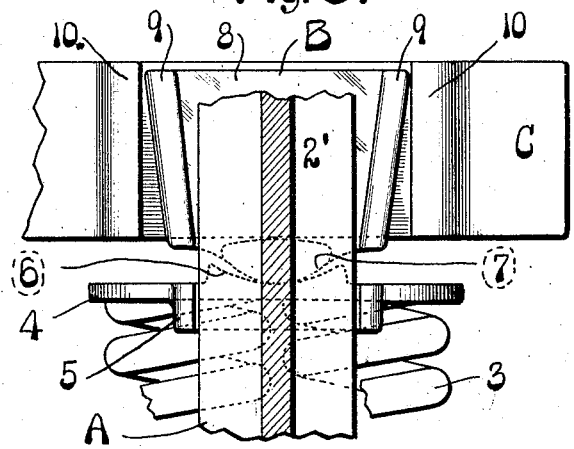
Figure 4:
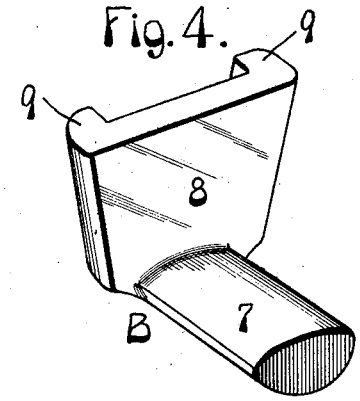
Figure 5:
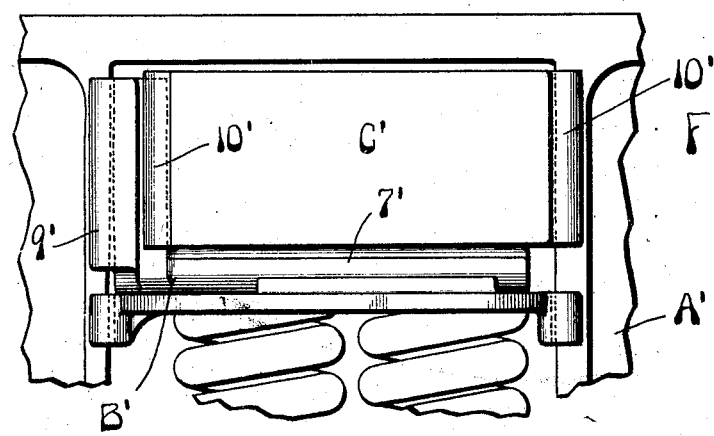
Figure 6:
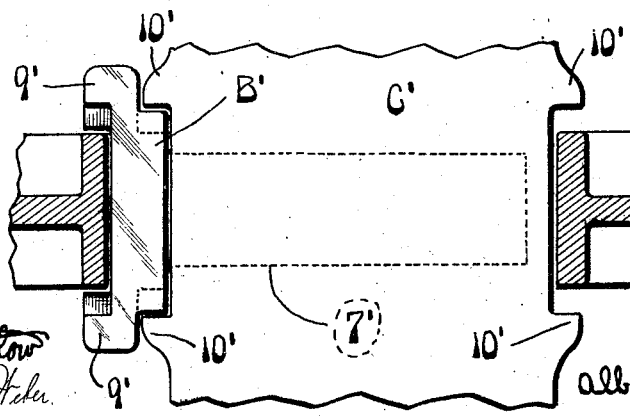
Figure 7:
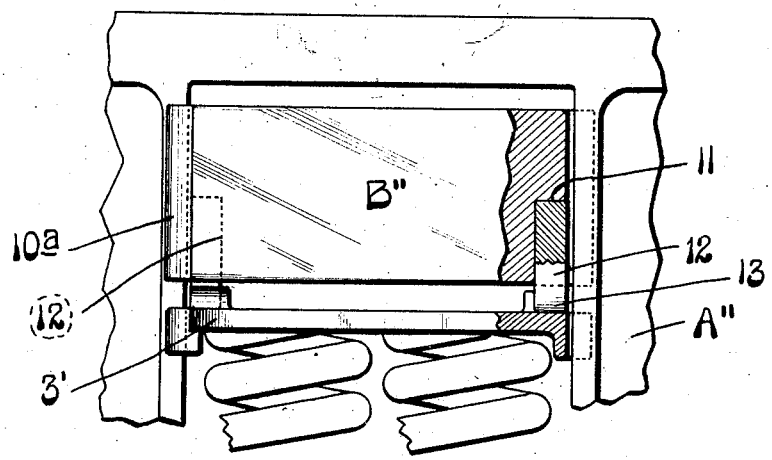
Figure 8:
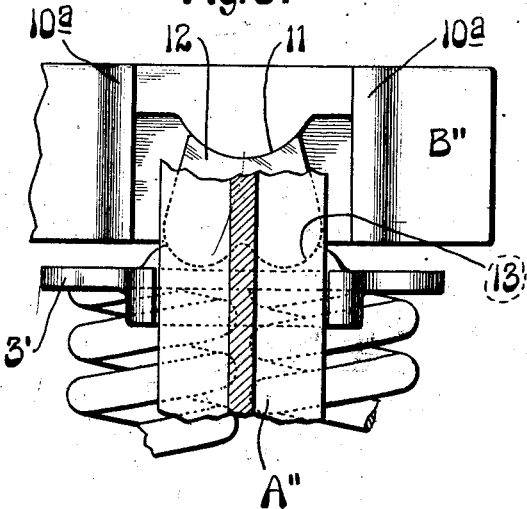
Figure 9:

Figure 1 is a side elevation of a portion of a car truck embodying the features of my invention; Fig. 2 is a plan view, partly in section, of the parts shown in Fig. 1; Fig. 3 is a section taken approximately on the line 3—3 of Fig. 1, the upper portion of the truck frame being broken away to more clearly show the movable bolster support; Fig. 4 is a perspective view of the movable bolster support; Fig. 5 is a side elevation of a portion of a car truck provided with a slightly modified form of the movable bolster support shown in Fig. 4; Fig. 6 is a plan view, partly in section, of the bolster, bolster support, and truck frame shown in Fig. 5; Fig. 7 is a side elevation, partly in section, illustrating another modification; Fig. 8 is a view similar to Fig. 3, showing the rockable bolster support seen in Fig. 7; and Fig. 9 is a perspective view of the bolster support shown in Fig. 7, and Fig. 8.

This invention relates to improvements in car trucks of the lateral motion type, one of the objects being to produce a novel and efficient device which will allow the truck bolster to move relative to the truck frame and cause the bolster to return to normal position after such movement.

Another object is to provide a car truck having a bolster of the standard type and a truck frame of the standard type combined with a lateral motion device which allows the bolster to be very easily fitted to, or removed from, the truck frame.

In the accompanying drawings:—A designates a portion of a well known form of truck frame (Figs. 1 and 2) which is shown merely to illustrate the function of the lateral motion devices, it being understood that this invention is not in any way limited to a truck frame constructed as herein shown.

Where I refer to a truck frame in the claims I mean to include a pair of side frames connected together, or any other suitable or desirable truck frame structure. However, as this invention may be used in connection with many well known truck frame structures I do not deem it necessary to show or describe a complete truck frame.

The truck frame shown in Fig. 1 and Fig. 2, is provided with a spring seat 1 and a bolster receiving opening 2. 3 designates springs mounted on the spring seat 1 and surrounded by a vertically movable spring plate 4, said plate having lugs 5 which are slidably fitted to the side walls 2' of the opening 2. A curved seat 6 is preferably formed on the upper face of the spring plate 4 to receive movable bolster supports B. Each bolster support B includes a rocker 7 which may be of any suitable shape, but it is preferably substantially D-shape in cross-section, the rocker shown having a curved bottom face which rests on the curved seat 6 and a flattened or slightly curved top face which constitutes a seat for the flat bottom face of the bolster C. A plate 8 extending upwardly from the rocker 7 and preferably formed integral therewith, is provided with a pair of inclined abutments 9 adapted to engage the side walls of the bolster receiving opening 2, said plate being arranged between the bolster and the side walls of said openings. Each end of a bolster C rests on rockers 7 and has the usual lugs 10 which are interlocked with the plates 8.

It will now be readily understood that the rockers 7 upon which the bolster is mounted, allow the bolster to move laterally relative to the truck frame and that the springs 3 are prevented from moving laterally by the plate 4 arranged between said rockers and the springs. As the bolster rests on the flattened or slightly curved top face of the rockers 7, said rockers are normally held in the position seen in Fig. 3, wherein the upper ends of the inclined abutments 9 lie adjacent to the bolster lugs 10 and the lower ends of said abutments are adjacent to the walls 2' of the bolster receiving opening. During the lateral movement of the bolster, abutments 9 are tilted toward the walls 2' of the bolster receiving opening and when the bolster moves a predetermined distance the abutments engage said walls and the bolster lugs 10 so as to serve as stops for preventing further movement of the bolster. The bolster is returned to normal position through the medium of the rockable members B which will rock on the curved seat 6 and return to the position seen in Fig. 3 after the force which caused the bolster movement has ceased.

The bolster may be removed from the truck frame by removing the springs 3, allowing the bolster supports B to drop below the bolster, and thereafter moving said bolster through the opening 2.

In Fig. 5 and Fig. 6 I have shown a modified form of the invention which owing to its simplicity may be more desirable than the form previously described. Each end of the bolster C' shown in Fig. 5 and Fig. 6, rests on a movable member B' and is provided with two pairs of abutments or lugs 10'. The lugs 10' at one side of the bolster are alined with the truck frame A' and the lugs 10' on the opposite side thereof are alined with abutments on the movable member B'. The member B' is arranged between the bolster and the truck frame and has abutments 9' adapted to engage said frame. Only one of the movable members B' is employed at each end of the bolster and the rocker 7' forming part of said movable member is therefore preferably longer than the rocker 7 as shown in Fig. 4.

Figs. 7 to 9 inclusive illustrate a modified form comprising a bolster B'' having lugs 10ª adapted to engage the frame A''. The side faces of the bolster are provided with recesses having curved top walls 11 which rest on the curved top faces of rockable bolster supports 12. Each rockable member 12 is provided with a pair of curved extensions 13 seated on correspondingly shaped faces on the spring plate 3'. Obviously these rockable bolster supports 12 allow the bolster to move laterally until the bolster lugs 10ª engage the truck frame, and after such movement the bolster is restored to normal position by the supports 12 which tend to return to the position shown in Fig. 8.

Having thus described the invention, what is claimed as new and desired to be secured by Letters Patent is:—

1. A car truck having a bolster provided with a flat bottom face, and a rocker upon which said flat face is seated, said rocker being interlocked with the bolster.

2. A lateral motion car truck comprising a frame having a bolster receiving opening, rockable bolster supports, and a bolster resting on said rockable bolster supports, a portion of each of said rockable supports being interposed between the bolster and a side wall of said opening.

3. A lateral motion car truck comprising a frame, rockable bolster supports, and a bolster seated on said rockable supports, a portion of each of said supports being interposed between said frame and a side face of the bolster.

4. A lateral motion car truck comprising a frame, springs supported by said frame, a vertically movable plate supported by said springs, a rockable bolster support resting on said plate, and a bolster resting on said rockable support, said rockable bolster support being located partly below the bolster and partly between said frame and the side of the bolster.

5. A lateral motion car truck comprising a frame, springs supported by said frame, a vertically movable plate supported by said springs, a rockable bolster support resting on said plate, and a bolster resting on said rockable support, said rockable bolster support being provided with abutments adapted to engage said frame.

6. A lateral motion car truck comprising a frame, a bolster, springs, and rockable bolster supports arranged between said bolster and springs, said bolster supports being provided with abutments adapted to engage said frame.

7. A car truck comprising a frame, a bolster, and rockable bolster supports provided with abutments having inclined faces adapted to engage said frame.

8. A car truck comprising a frame, a bolster, and rockable bolster supports provided with abutments having inclined faces adapted to engage said bolster.

9. A lateral motion car truck comprising a frame, a bolster, springs, and a rockable bolster support a portion of which is arranged between said bolster and springs, said rockable bolster support being provided with abutments adapted to be engaged by the bolster.

10. A lateral motion car truck comprising a frame, a bolster, springs, and a rockable bolster support a portion of which is arranged between said bolster and springs, said rockable bolster support being provided with abutments adapted to engage said frame and bolster.

11. A car-bolster support comprising a rocker, substantially D-shape in cross section, said rocker having a curved bottom face and a comparatively flat top face adapted to constitute a seat for the bolster, and a pair of abutments extending from said rocker.

In testimony whereof I hereunto affix my signature in the presence of two witnesses, this 15th day of August, 1911.

ALBERT J. McCAULEY.

Witnesses:
FANNIE E. WEBER,
C. H. MARTENS.